Aug. 30, 1966　　　　S. J. WHITTAKER　　　　3,269,735
HIGH PRESSURE SEALING DEVICE
Filed Nov. 16, 1964　　　　　　　　　　　　3 Sheets-Sheet 1
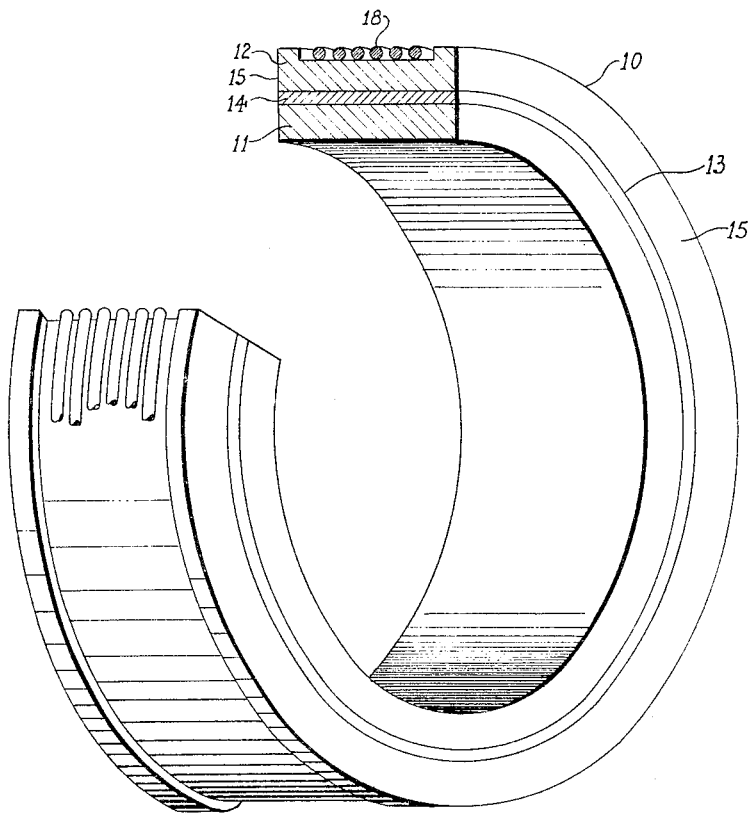
Fig-1
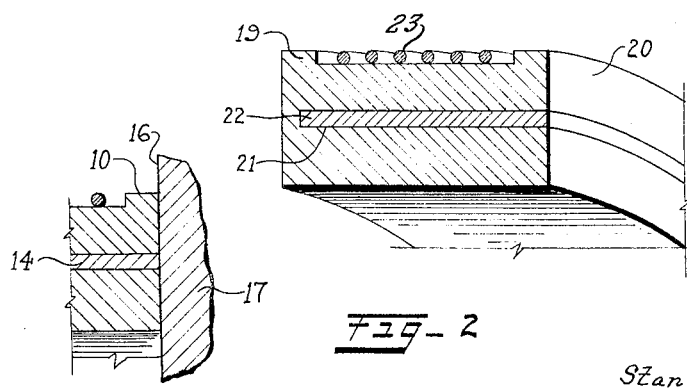
Fig-2
Fig-3
INVENTOR
Stanley J. Whittaker
BY Harold A. Weir
PATENT AGENT Aug. 30, 1966    S. J. WHITTAKER    3,269,735
HIGH PRESSURE SEALING DEVICE Filed Nov. 16, 1964    3 Sheets-Sheet 3

INVENTOR
Stanley J. Whittaker

BY Harold A. Weir

PATENT AGENT 3,269,735
HIGH PRESSURE SEALING DEVICE
Stanley J. Whittaker, Deep River, Ontario, Canada, assignor to Atomic Energy of Canada Limited, Ottawa, Ontario, Canada, a corporation of Canada
Filed Nov. 16, 1964, Ser. No. 411,405
4 Claims. (Cl. 277—22)

This invention relates to high pressure sealing devices.

It is an object of this invention to provide a high pressure seal which is capable of being broken and resealed many times without deterioration, and which is of simple construction and operation.

The invention resides in a seal which comprises a shell or body member of high strength material with relatively low thermal expansion and having a planar seal-applying surface and a recess in said surface, and a ductile seal material of relatively high thermal expansion seated in said recess and being normally located substantially within said recess, said ductile seal material being arranged to expand outwardly beyond the plane of said surface on application of a predetermined degree of heat to said body member.

Figure 4:
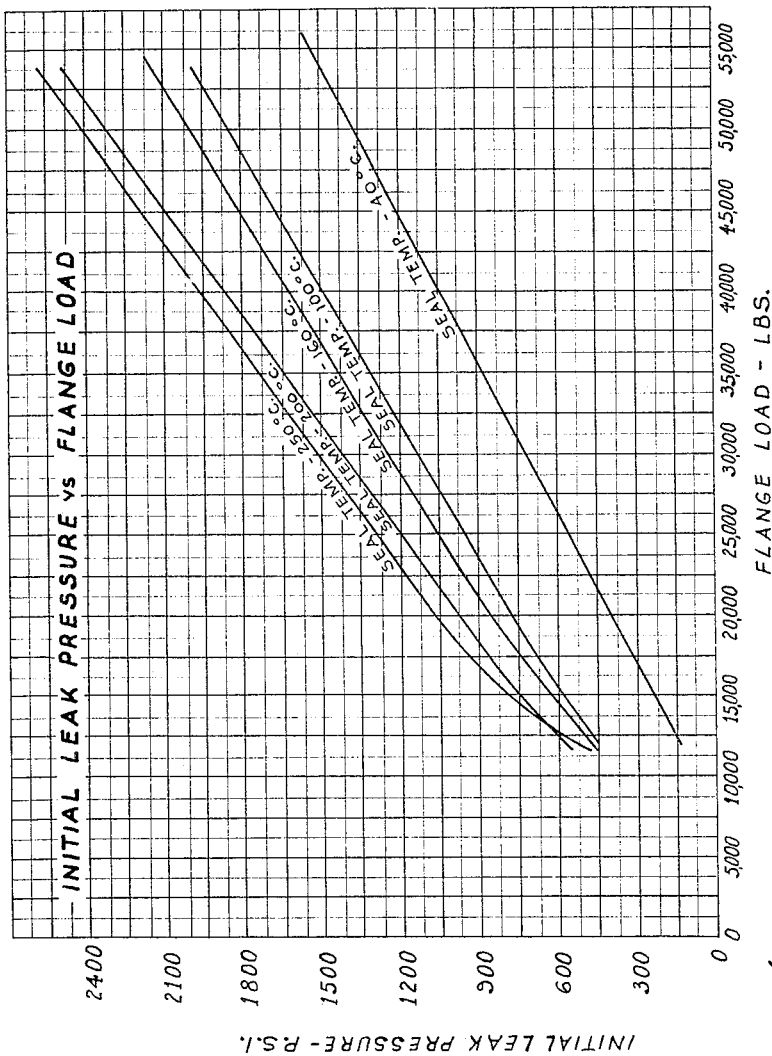
Figure 6:
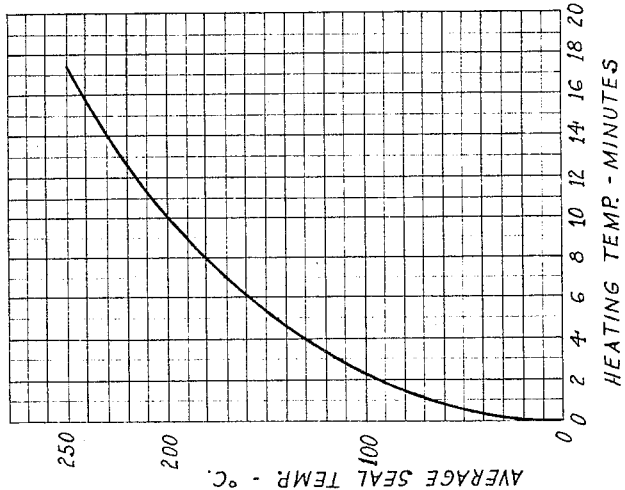
Figure 5:
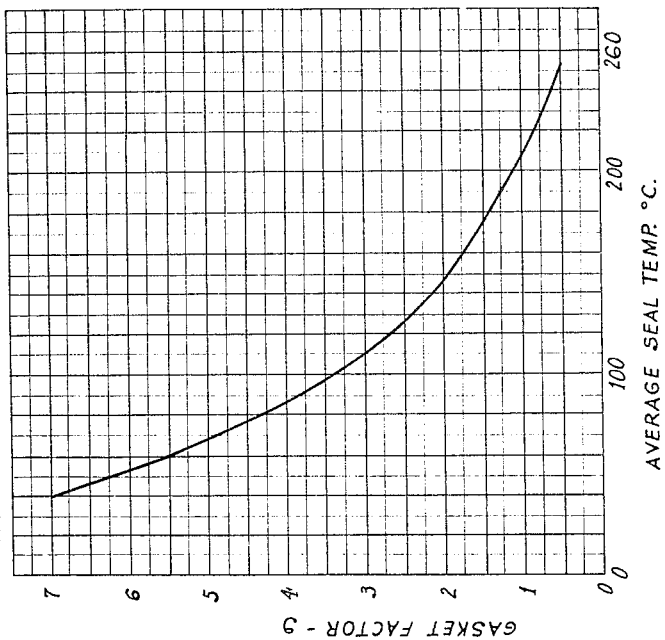

The invention will be defined with reference to the accompanying drawing, in which FIGURE 1 is a perspective view of a sealing device in accordance with the invention, FIGURE 2 is a partial, sectional perspective view of a modified form of sealing device, FIGURE 3 is a partial, sectional elevation of the sealing device in sealing position with a second member, and FIGURES 4, 5 and 6 are graphs illustrative of operating conditions of the seal.

Referring to FIGURE 1, the body member is shown as comprising an annular shell 10 which, as illustrated, consists of concentric inner and outer rings 11 and 12. The external diameter of ring 11 and the internal diameter of ring 12 are such as to provide a recess 13 between the outer surface of ring 11 and the inner surface of ring 12. Seated in this recess is a body 14 of ductile seal material.

The body member or shell 10 is formed of a high strength material of low thermal expansion. It may comprise various types of steels and low-expansion alloys of iron and nickel, such as Invar. Its coefficient of expansion range is approximately 0 to $13 \times 10^{-6}$ inches/inch/° C.

The seal material may comprise any high expansion ductile material such as copper, aluminum, cadmium, zinc, lead, bismuth, magnesium, tin, gold, silver, indium, sodium, thallium, selenium and various alloys of such metals. Its coefficient of expansion range is approximately $13 \times 10^{-6}$ to $71 \times 10^{-6}$ inches/inch/° C.

It is desirable to select materials wherein there is as great as possible difference in the coefficients of expansion of the low expansion and high expansion materials consistent with other structural, operational and economic factors.

The body member 10 has planar opposed surfaces 15 and, normally, the ductile body 14 will be disposed wholly within the recess 13 with its exposed surfaces lying approximately in the respective planes of surfaces 15.

It will be apparent that, on application of a predetermined degree of heat to the body member 10 and the seal material 14 therein, the latter, because of its relatively high expansion property, will be extruded beyond the planes of surfaces 15. Thus, as shown in FIGURE 3, if a surface 15 of member 10 is in approximate engagement with the surface 16 of a member 17 with which a seal is required, the ductile body 14 will sealingly engage such surface 16 under the pressure of its expansion with respect to member 10.

It will also be apparent that the shell or body member 10 is of sufficient strength that, upon heating, it will apply a restraining (extruding) force to the seal material 14.

Heat may be applied to the device in any suitable manner depending to large extent upon the particular structural form and installation of the device. For instance, a coaxial heating coil 18 may be mounted directly on the outer ring 12.

FIGURE 2 illustrates a modification wherein the shell 19 has only one surface 20 to be sealed. In this case, a recess 21 extends partially across the shell and contains a body 22 of ductile seal material. A heating coil 23 is also shown as incorporated in this device.

A major advantage of the invention resides in the fact that the device provides a ductile surface that will seal repeatedly against rough surfaces. Very high seal pressures can be achieved which are far beyond the yield point of the sealing material, without causing permanent distortion, since the containing shell elastically loads the seal material. As the seal material is heated between mating members, the seal pressure increases as the walls are elastically strained by differential expansion of the two materials. As the seal cools the elastic strain is removed from the shell walls and the seal returns to its original state. This permits repeated use without seal deterioration.

For highly oxidizing or corrosion conditions, the ductile material could be formed of one material capped with an oxidation or corrosion-resistant material such as gold, silver, platinum, or the like.

The sealing device is useful in many types of installations. It has been employed for remote operation in which a nuclear fueling machine must repeatedly break into the reactor coolant circuit to replace spent fuel. The seal illustrated may be employed to join the fueling machine to the reactor cooling circuit which operates at approximately 500° F. and 1100 p.s.i. This and other forms of the seal are useful in a wide range of temperature, pressure, and fluid conditions. A reduction in normal bolt tension requirements can be achieved due to the use of the ductile sealing material which reduces the gasket factor. The sealing device is thus applicable to flange components which are subject to high pressure temperature conditions where thermocycling may cause yielding or creep of high tension bolts employed in the flange components.

The graphs shown in FIGURES 4, 5 and 6 show statistics of actual use of the seal described. A 4 inch internal diameter seal was employed, using 403 stainless steel for the annulus and lead for the sealing material.

FIGURE 4 plots the load in pounds with respect to initial leak pressure (p.s.i.). The device was capable of repeatedly maintaining a leak tight seal on surfaces as rough as 200 micro-inch finish at 500° F. and 1500 p.s.i.

FIGURE 5 shows the gasket factors for average seal temperatures. It will be observed that for a seal temperature of 40° C., a seal can be maintained if the flange load is sufficiently high to produce a gasket factor of 7. This factor drops to 0.4 at 250° C. which is lower than a rubber gasket.

The heating curve in FIGURE 6 shows the seal heat-up time using a built-in 2400 watt heater.

An example of a reasonable operating procedure would be to apply a flange load in excess of 40,000 lbs., and heat the seal to 100° C. (2 minutes) before allowing water in the system. This will maintain a seal to 1500 p.s.i. in cold water. Heating of the water would, of course, actuate the seal to produce a more effective seal without increasing the temperature.

I claim:
1. A sealing device comprising a body member composed of material having a low coefficient of thermal expansion, said body member having a flat seal-applying surface lying in a single plane and a recess in said surface, and a body of ductile seal material having a high coefficient of thermal expansion seated in said recess and being normally disposed substantially wholly within said recess, said ductile seal body being expansible to extrude a portion thereof outwardly beyond the plane of said surface on application of a predetermined degree of heat thereto and a heating device mounted on said body member for applying said predetermined degree of heat thereto.

2. A sealing device as defined in claim 1, wherein said body member material is selected from the group consisting of steels and low-expansion alloys of iron and nickel, and said ductile seal material is selected from the group consisting of copper, aluminum, cadmium, zinc, lead, bismuth, magnesium, tin, gold, silver, indium, sodium, thallium, selenium, and alloys thereof.

3. A sealing device as defined in claim 1, wherein said body member material has a coefficient of thermal expansion of substantially less than $13 \times 10^{-6}$ inches/inch/° C., and said ductile seal material has a coefficient of thermal expansion of substantially greater than $13 \times 10^{-6}$ inches/inch/° C.

4. A sealing device comprising an annular member composed of material having a low coefficient of thermal expansion, said annular member having a flat seal-applying end surface lying in a single plane and a circular recess in said surface, and a body of ductile seal material having a high coefficient of thermal expansion substantially filling said recess and being normally disposed substantially within said recess, said ductile seal body being expansible to extrude a portion thereof outwardly beyond the plane of said surface on application of a predetermined degree of heat thereto and a heating device mounted on said body member for applying said predetermined degree of heat thereto.

References Cited by the Examiner

UNITED STATES PATENTS

| 1,857,961 | 5/1932 | Lamb | 277—26 |
| 3,015,504 | 1/1962 | Fulton et al. | 277—26 |
| 3,038,731 | 6/1962 | Milleron | 277—22 |

FOREIGN PATENTS

| 454,030 | 1/1949 | Canada. |

SAMUEL ROTHBERG, *Primary Examiner.*